Patented Nov. 7, 1950

2,529,010

UNITED STATES PATENT OFFICE 2,529,010

POLYMERIZATION OF OLEFINS

Alvin H. Friedman, Bartlesville, Okla., assignor to Phillips Petroleum Company, a corporation of Delaware No Drawing. Application April 15, 1946, Serial No. 662,413

6 Claims. (Cl. 260—683.15)

This invention relates to the conversion of normally gaseous hydrocarbons to normally liquid hydrocarbons and in a particular aspect to the polymerization of normally gaseous olefins to olefins of higher molecular weight which are liquid at normal temperatures Olefinic hydrocarbons are frequently subjected to polymerization to convert normally gaseous compounds to liquids, to produce fuels for internal combustion engines, to produce new compounds, and to produce materials such as plastics, rubber and the like. Particularly in motor fuels, polymerization of olefinic hydrocarbons improves the octane rating of the hydrocarbons in the gasoline range. This improvement is one of the most important purposes of polymerization in the petroleum field. Extensive polymerization of unsaturated gases or further polymerization of the initial reaction products may be employed to form heavy polymers comprising plastics, lubricating oils, rubber and resinous products. Unsaturated gases from any source are suitable as starting material, but these gases may be readily obtained in the effluent from cracking and dehydrogenation processes. If polymerization is accomplished soon after the cracking process, thermal polymerization is usually employed following thermal cracking and catalytic polymerization following catalytic cracking since the optimum conditions for both processes of corresponding types are closely related, and considerably less handling of the material may be necessary when so arranged. However, products from any type of cracking or dehydrogenation are suitable charge stock for either type of polymerization process. For catalytic polymerization the catalysts which have been found useful include phosphoric and sulfuric acids, aluminum chloride, and boron fluoride, which may be used either alone or mixed with hydrogen fluoride.

I have found that unusually good yields of polymerized products are obtained by reacting olefins in the presence of hydrogen fluoride and siliceous materials, or, that is, silicon tetrafluoride. Siliceous materials such as clay, silica, and silica gels have been disclosed as carriers for polymerization catalysts, but to my knowledge, the siliceous compound disclosed as the catalyst of this invention has not been previously proposed. Silicon tetrafluoride is evolved rapidly when hydrogen fluoride contacts siliceous material such as glass and its low liquefaction point is conducive to a vapor phase conversion process.

It is therefore an object of the invention to provide for the conversion of olefinic hydrocarbons in the presence of a novel catalyst.

Another object is the polymerization of unsaturated hydrocarbon compounds in the presence of silicon tetrafluoride.

Another object is to provide for the conversion of normally gaseous olefinic to liquid hydrocarbons in the presence of silicon tetrafluoride.

Still a further object is to provide for the polymerization of olefinic hydrocarbons in the presence of silicon tetrafluoride formed in situ from hydrogen fluoride and siliceous material.

Other objects will be apparent from the disclosure and examples discussed herein.

In a specific embodiment of the present invention, gaseous or vaporized olefins are admixed with hydrogen fluoride vapors and conducted through a mass of siliceous material, e. g., finely divided or spun glass such as glass wool, between about 250 to 400° C. under superatmospheric pressure. The hydrofluoric acid forms silicon tetrafluoride immediately on contact with the siliceous material. A small amount of water is formed in the reaction between the acid and siliceous material. The water may react with silicon tetrafluoride to form silicic acid and hydrogen fluoride which with the hydrogen fluoride present may form an aqueous solution of hydrofluosilicic acid with a portion of the silicon tetrafluoride. These side reactions are of minor importance, and do not interfere with the satisfactory operation of the present invention. By using anhydrous hydrofluoric acid, which is itself extremely hygroscopic, these by-product reactions are further minimized and for that reason anhydrous acid is preferable. Silicon tetrafluoride may be prepared separately outside the reaction zone and introduced into the process as such or in admixture with anhydrous hydrogen fluoride, but for simplicity of equipment and convenience, it is preferred to prepare the silicon tetrafluoride in situ by the reaction of the hydrogen fluoride with the siliceous material, which has the added advantage of utilizing the catalyst in its "nascent" or most highly active state. Crushed, finely ground, powdered glass or finely spun glass such as glass wool has been found satisfactory for the siliceous material as well as glass helices, bead, balls, etc., furnishing a large contact surface. The composition of the glass is immaterial, but glasses having relatively high percentages of silicon are, of course, preferred.

The following comparative examples show the advantages and importance of the catalyst described and the unexpected high yields of polymeric products which could not have been predicted from the action of hydrogen fluoride alone.

Example I

Ninety-three parts by weight of butene-1 were mixed with 7 parts by weight of anhydrous hydrofluoric acid. The mixture, containing 9.6 weight per cent polymer (material boiling above 40° C.), was passed over glass wool in a furnace tube at 300° C. and 200 pounds per square inch pressure. The effluent, after 18 minutes contact time, contained 58 weight per cent polymer, 13 weight per cent butyl fluoride and 29 weight per cent unconverted butene. The polymer represents about 49 per cent conversion of the olefin.

In this example and those following, the polymeric material is represented by that material which boils above 40° C., this value being substantially above the boiling point of any byproducts of the reaction, such as the butyl fluorides.

*Example II*

In an experiment with similar conditions and proportions of reactants, the mixture of butene and hydrofluoric acid, containing 4.9 weight per cent of polymer, was conducted through a heated furnace tube in the absence of glass wool. By the same examination, the polymer content of the effluent was 4.2 weight percent, showing that under the conditions and influence of hydrofluoric acid alone substantially no net polymerization of the olefin was produced.

*Example III*

Ninety-five parts by weight of propylene was mixed with 5 per cent by weight of anhydrous hydrofluoric acid and the mixture, substantially free of polymers, was conducted through a heated furnace containing ⅛-inch glass helices at 300° C. and 400 pounds per square inch pressure for a contact time of 20 minutes. The polymer content of the effluent was 30 weight per cent, which indicates the percent conversion.

A comparison of the first and second examples shows that the presence of siliceous material and thereby of silicon tetrafluoride promotes the polymerization of the olefinic materials. Substantial yields of polymers are indicated by the third example. Although the use of glass in various forms has been described in the examples, it is obvious that other siliceous substances, such as silica, silica gels, silicon-containing clays and like material, may be used effectively or silicon tetrafluoride itself, with or without hydrofluoric acid, may be introduced into the reaction in place of the materials from which it is formed, as described above.

The proportion of the olefin and acid or of the catalyst, silicon tetrafluoride, are not critical, since the presence of relatively small amounts of the catalyst are effective. The most desirable temperature and pressure to effect the best conversion will vary, depending upon the characteristics of the olefin being treated. The extent of the polymerization and nature of the products likewise depend upon the length of the contact time with the catalytic material.

Other olefins or mixtures of olefins than those of the examples are equally applicable to polymerization in the presence of the catalyst described. Depending upon the molecular weight of the charge stock and the extent of polymerization obtained, valuable products of gasoline boiling range and heavier oils may be recovered in the present invention. The examples are illustrative only and are not intended to limit the invention. Various applications of the invention will be obvious to one skilled in the art and the claims are intended to include all the novelty inherent with the invention.

I claim:

1. A process for polymerizing an unsaturated polymerizable hydrocarbon and for forming a catalyst which comprises admixing said unsaturated hydrocarbons with hydrogen fluoride, contacting the resulting admixture while in the vapor phase with a silica containing material capable of reacting with said hydrogen fluoride to form silicon tetrafluoride and polymerizing said unsaturated hydrocarbon in the presence of the thus formed silicon tetrafluoride while maintaining said hydrocarbon in a vapor phase.

2. A process for polymerizing an unsaturated polymerizable hydrocarbon and for forming a polymerization catalyst for said polymerization which comprises admixing said unsaturated hydrocarbon with anhydrous hydrogen fluoride, contacting the resulting mixture at a temperature within the range of 250° to 400° C. and while in the vapor phase with a siliceous material capable of reacting with said hydrogen fluoride contained in said mixture to form silicon tetrafluoride and polymerizing said unsaturated hydrocarbon in the presence of the thus formed silicon tetrafluoride at a temperature within the aforesaid range.

3. A process for polymerizing propylene which comprises admixing said propylene with anhydrous hydrogen fluoride in a weight ratio of 95 to 5, contacting said admixture with glass at a temperature of 300° C. and a pressure of 400 pounds per square inch whereby said hydrogen fluoride reacts with said glass to form silicon tetrafluoride and whereby said propylene is polymerized in the presence of the thus formed silicon tetrafluoride while said propylene is in the vaporous phase.

4. A process for polymerizing butene-1 which comprises admixing said butene-1 with anhydrous hydrogen fluoride in a weight ratio of 93 to 7, contacting said admixture with glass at a temperature of 300° C. and at a pressure of 200 pounds per square inch whereby said hydrogen fluoride reacts with said glass to form silicon tetrafluoride and whereby said butene-1 is polymerized in the presence of the thus formed silicon tetrafluoride while said butene-1 is in the vaporous phase.

5. A process for the polymerization of an unsaturated polymerizable hydrocarbon which comprises contacting said hydrocarbon while in the vaporous phase with a catalyst consisting of silicon tetrafluoride at a temperature within the range of 250 to 400° C. and at superatmospheric pressure.

6. A process for the production of a normally liquid hydrocarbon product which comprises polymerizing a normally gaseous polymerizable olefin while in the vapor phase and at a temperature within the range of 250 to 400° C. in the presence of a catalyst consisting essentially of silicon tetrafluoride.

ALVIN H. FRIEDMAN.

REFERENCES CITED

The following references are of record in the file of this patent:

UNITED STATES PATENTS

| Number | Name | Date |
|---|---|---|
| 2,406,954 | Linn | Sept. 2, 1946 |
| 2,421,950 | Linn | June 10, 1947 |
| 2,430,181 | Linn | Nov. 4, 1947 |

FOREIGN PATENTS

| Number | Country | Date |
|---|---|---|
| 326,322 | Great Britain | Mar. 13, 1930 |

OTHER REFERENCES

Bruson et al., Ind. & Eng. 18, 381-3 (1926).